United States Patent [19]

Pääbo et al.

[11] 4,093,551

[45] June 6, 1978

[54] DEVICE FOR PURIFYING SEWER WATER IN SMALL SEWER SYSTEMS

[75] Inventors: Ülo Pääbo, Kristianstad; Erik Horskjär Albertsen, Bromolla, both of Sweden

[73] Assignee: IFO AB, Bromolla, Sweden

[21] Appl. No.: 745,665

[22] Filed: Nov. 29, 1976

[30] Foreign Application Priority Data

Dec. 11, 1975 Sweden .............................. 7514038

[51] Int. Cl.² ........................... C02B 1/20; C02C 5/02
[52] U.S. Cl. .................................... 210/201; 137/134; 210/207; 210/209
[58] Field of Search ............................ 23/272.7, 272.8; 137/124, 132, 134; 210/201, 207, 208, 209

[56] References Cited

U.S. PATENT DOCUMENTS

| 292,046 | 1/1884 | Powers | 210/209 X |
| 831,059 | 9/1906 | Greth | 137/124 |
| 1,150,673 | 8/1915 | Greth et al. | 137/124 |
| 2,479,842 | 8/1949 | Kirwan | 23/272.7 X |
| 2,604,444 | 7/1952 | Piccardo | 210/208 X |

FOREIGN PATENT DOCUMENTS 525,626  5/1931  Germany .............................. 137/124

Primary Examiner—Charles N. Hart
Assistant Examiner—Robert H. Spitzer
Attorney, Agent, or Firm—Flynn & Frishauf

[57] ABSTRACT

A device for purifying water in small sewer systems (e.g. a system connected to one or a few family houses) includes means for automatic addition of a chemically active liquid to the water passing through the device. The invention eliminates the need of any movable parts by using two siphon tubes controlling the liquid supply. One of the siphon tubes is traversed by the sewer water and the corresponding flow generates a suction which is relied upon to transfer the chemically active liquid through the second siphon tube.

4 Claims, 1 Drawing Figure

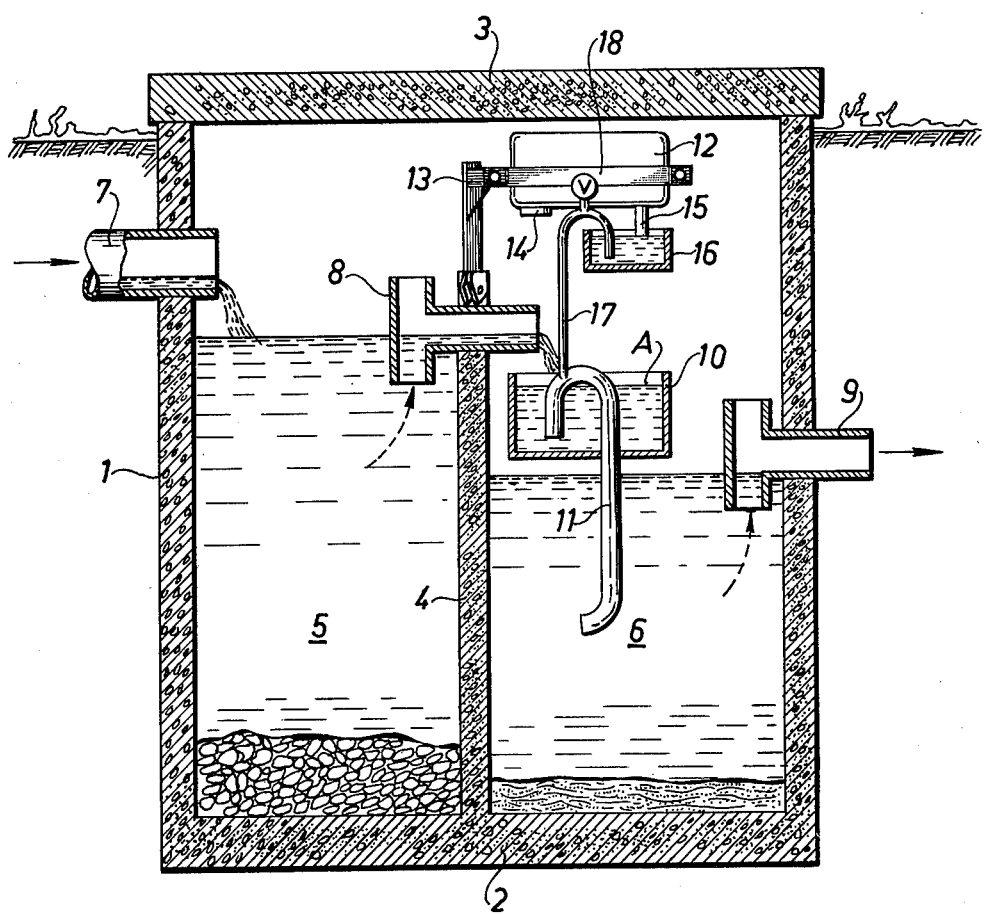

DEVICE FOR PURIFYING SEWER WATER IN SMALL SEWER SYSTEMS

The present invention relates to a device for purifying the sewer water in such small sewer water systems where chemical cleaning of the water takes place by means of the addition to the water of a liquid containing chemical substances which promote the sedimentation, in a chamber, of contaminations in the water. The inlet of the chamber is at a higher level than the outlet, and at an intermediate level there is a vessel which receives both the incoming sewer water and the liquid. The supply of the liquid takes place from a receptacle via a tube operating according to the siphon principle.

Since the supply of sewer water to such a device varies in time it is not possible to supply the chemical treatment liquid continuously. Instead, the supply rate has to follow that of the sewer water. It belongs to the art to attain such a control of the liquid supply by feeding it through a valve mechanically controlled by a tiltably mounted hopper. When the hopper has received a certain amount of incoming sewer water, it tilts from its normal position and its corresponding movement is used to actuate the valve.

Due to the environmental conditions in a device of this type there is, however, a most considerable risk that movable parts are immobilized which means a discontinuation of the operation of all of the device. The object of the present invention is to provide a purifying device which does not comprise any movable parts but nevertheless automatically controls the supply of the chemical treatment liquid in response to the supply of sewer water.

SUMMARY OF THE INVENTION

According to the present invention this object has been realized by connecting the bottom end of a siphon tube to the top portion of a second siphon tube the inlet of which is located inside the vessel, whereas its outlet orifice is outside the vessel.

It does per se belong to the prior art to use the first one of the two siphon tubes above discussed for the purpose of mixing a liquid with a gas or another liquid. In such prior art systems the suction in the siphon tube is generated by an injector driven by the rapidly flowing gas or liquid. Naturally, such a prior art arrangement cannot be used in a sewer water purifying device of the type here concerned where the water flow is very slow.

BRIEF DESCRIPTION OF THE DRAWING

One embodiment of the invention will now be described with reference to the accompanying drawing showing a vertical section through a slurry separator comprising a flocculation chamber and arranged according to the invention.

DETAILED DESCRIPTION

In the illustrated embodiment the slurry separator is intended to be buried in the ground and forms a well 1 made of concrete and provided with walls and an integral bottom 2. Reference numeral 3 designates a lid. The interior of the well is, by a partition 4, divided into two chambers 5 and 6. Chamber 5 receives the incoming contaminated water through a tube 7 and comprises a so-called primary sedimentation chamber, meaning that the biggest and heaviest contamination particles are sedimented therein. They sediment by gravity action and they are prevented from flowing into chamber 6 by virtue of the configuration of tube 8 which interconnects the two chambers. As is easily seen from the drawing, in order for such big and heavy particles to flow from chamber 5 to chamber 6 they would have first to flow upwards through the lower vertical leg of tube 8.

The final sedimentation takes place in chamber 6 from where the purified water leaves the device through an outlet tube 9. Tube 9 may in turn be connected with an open recipient or receptacle. Alternatively, the outgoing water may be received by the surrounding ground through infiltration or resorption.

Considering chamber 6 it will be seen that tubes 8 and 9 form the inlets and outlets thereof, respectively. The drawing clearly illustrates that the inlet 8 is at a considerably higher level than the outlet 9. At an intermediate level there is a vessel 10 located below the outlet orifice of tube 8, meaning that the water passing through the outlet orifice of tube 8 will flow down into vessel 10. From there it continues through a siphon tube 11. The corresponding operation is as described below.

Let it be assumed that the liquid level in chamber 5 has reached the bottom of the horizontal leg of T-tube 8 and that more water is supplied through tube 7. Accordingly, water will flow through tube 8 down into vessel 10. When the water level in vessel 10 has reached level A, siphon 11 starts operating and empties vessel 10. Naturally, more water may be received by vessel 10 either during the operation of siphon 11 or after completion of the operation thereof. When the liquid level in chamber 6 has risen up to the bottom of outlet tube 9 the liquid starts flowing out through tube 9.

The chemical cleaning in chamber 6 is carried out by means of a treatment liquid supplied from a container 12. Container 12 is mounted below lid 3 and is supported by a frame 13 which in this case is attached to partition 4. Container 12 is, for example, made of a synthetic resin material and has a lid 14. It should be observed that in the mounted position of container 12, lid 14 is facing downwards or, stated otherwise, container 12 is mounted upside-down. A tube 15 leads from the bottom wall of container 12 and opens into a receptacle 16. The upper orifice of a siphon tube 17 is located inside receptacle 16, preferably close to the bottom thereof but, in any case, considerably lower than the outlet orifice of tube 15. The bottom end of siphon tube 17 is connected to siphon tube 11 adjacent the top thereof. As is understood, when siphon 11 operates and a suction is generated therein there will also be a suction in tube 17. The liquid level in receptacle 16 will normally coincide with the bottom end of tube 15, because the pressure of the surrounding air will balance the weight of the liquid in container 12. However, when siphons 11 and 17 start operating, the initial reaction is naturally that the level in receptacle 16 tends to be lowered. However, as soon as the bottom orifice of tube 15 is exposed, air can penetrate into container 12 and bubble through the liquid up to the free space above the level thereof. This will result in a continued supply of liquid into receptacle 16. Accordingly, the liquid in container 12 will be fully automatically supplied to chamber 6 and such supply will only take place when needed, i.e. when sewer water enters chamber 6. The added liquid and its active chemical substances are thus brought into immediate contact with the slurry just entering chamber 6.

Reference numberal 18 designates a valve mounted at the top of siphon tube 17. By means of valve 18 it is possible to control the suction in siphon tube 17 and in that way to control the amount of liquid supplied. When the liquid flow through siphon tube 11 has ceased, air entering siphon tube 17 through valve 18 will discontinue also the suction in tube 17. Alternatively, receptacle 16 may be mounted so that the surface of the liquid therein is in level with the connection between tubes 17 and 11. In such a case the liquid supply will be discontinued as soon as the level in receptacle 16 has fallen below the level through the junction between tubes 11 and 17 without any need for introducing air through a valve.

It is also apparent from the drawing and from the above description that the device does not include any movable parts and, as was described in the introduction, the corresponding advantage is most significant in installations of the type concerned.

What we claim is:

1. A device for purifying sewer water in small sewer systems, said purifying device having no moving parts, comprising:

a sedimentation chamber (6) having an inlet (8) for receiving sewer water, means for receiving and holding water to be sedimented and an outlet (9) for removing sedimented water from said sedimentation chamber, said outlet (9) being mounted a predetermined distance above the bottom of said chamber (6) to provide a pool of water for sedimentation in said receiving means of said sedimentation chamber (6), and said inlet (8) being located at a higher level than said outlet (9);

a vessel (10) mounted in said sedimentation chamber (6) at an intermediate level between the levels of said inlet (8) and outlet (9), said vessel (10) being disposed to receive sewer water from said inlet (8) and to retain sewer water therein at a level above said pool of water in said sedimentation chamber (6);

a receptacle (16) in said sedimentation chamber (6) for holding a liquid containing sedimentation-promoting substance, said receptacle (16) being mounted at a higher level than said vessel (10);

a container (12) located completely above said receptacle (16) for supplying said liquid to said receptacle (16), said container (12) having a liquid outlet tube (15) connected adjacent its bottom but being otherwise provided with air-tight walls, said outlet tube (15) extending downwardly into said receptacle (16);

a first siphon tube (17) having an inlet in said receptacle (16) and a lower outlet in communication with said vessel (10) for supplying said liquid from said receptacle (16) to said vessel (10); and a second siphon tube (11) having an inlet within said vessel (10) and a lower outlet in said chamber (6) outside said vessel (10), said lower outlet of said second siphon tube (11) being located below the liquid level in vessel (10) and at a lower level than said outlet (9) of said sedimentation chamber (6), said lower outlet of said first siphon tube (17) being connected to the top portion of said second siphon tube (11) such that when suction is developed in said second siphon tube (11), suction is thereby developed in said first siphon tube (17) to supply said liquid to said sewer water.

2. A purifying device according to claim 1 wherein said inlet of said first siphon tube (17) extends into said receptacle (16) to a lower depth than said outlet tube (15) of said container (12) and always extends downwardly below the liquid level in said receptacle (16).

3. A purifying device according to claim 1 further comprising a valve (18) coupled to the top of said first siphon tube (17) for controlling the suction in said first siphon tube (17).

4. A purifying device according to claim 1 wherein said outlet (9) of said chamber (6) comprises a vertical conduit portion through which liquid must flow upwardly before being passed out of said chamber (6) through said chamber outlet (9).

* * * * *